Figure 1:
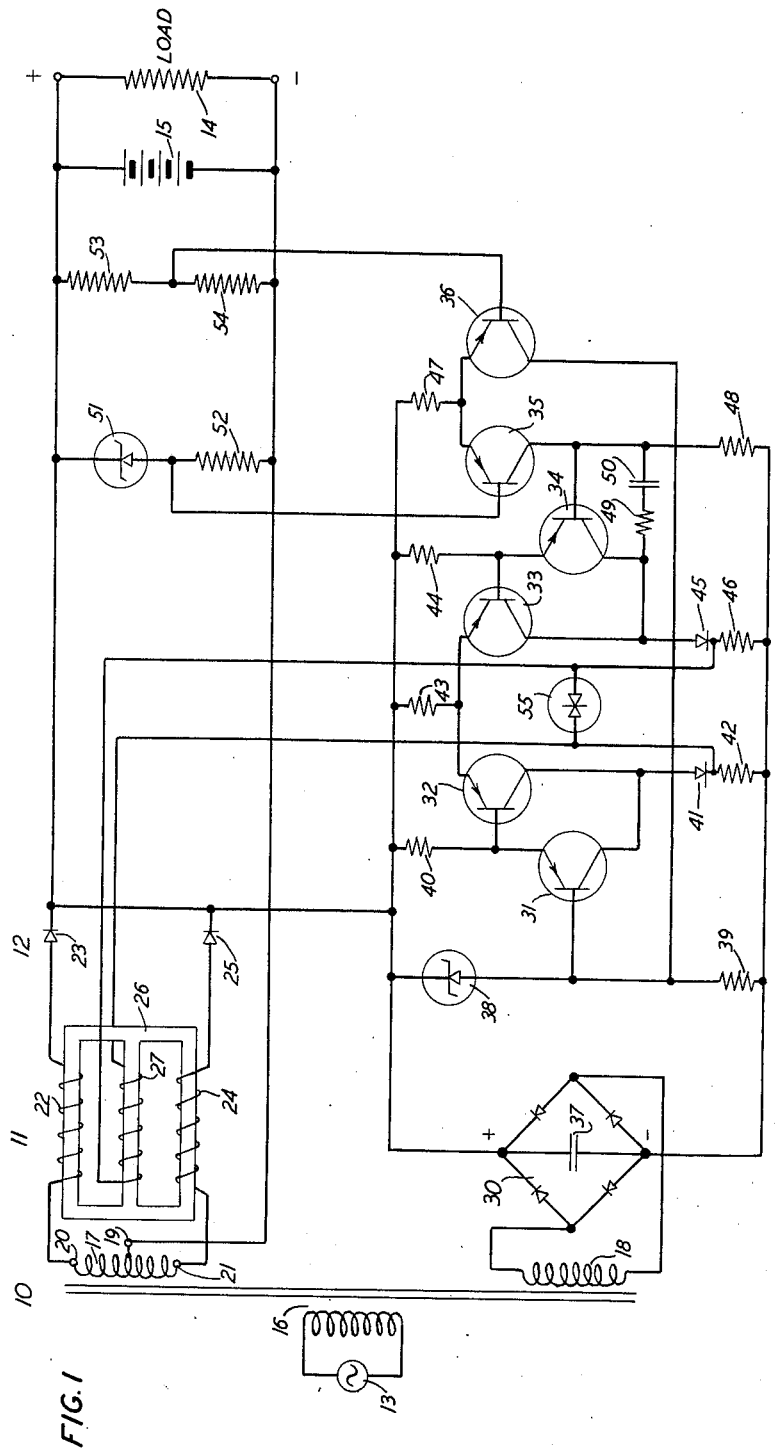

Aug. 10, 1965          L. J. GREEN           3,200,328
                 CURRENT SUPPLY APPARATUS
Filed Jan. 30, 1962                      2 Sheets-Sheet 1

INVENTOR
L. J. GREEN
BY
G. F. Heuerman
ATTORNEY

Aug. 10, 1965  L. J. GREEN  3,200,328
CURRENT SUPPLY APPARATUS

Filed Jan. 30, 1962  2 Sheets-Sheet 2

INVENTOR
*L.J. GREEN*
BY
*G.F. Heuerman*
ATTORNEY

United States Patent Office 3,200,328
Patented Aug. 10, 1965

3,200,328
CURRENT SUPPLY APPARATUS
Lowell J. Green, Columbus, Ohio, assignor to North Electric Company, Galion, Ohio, a corporation of Ohio
Filed Jan. 30, 1962, Ser. No. 169,824
9 Claims. (Cl. 323—89)

This invention relates to current supply apparatus and particularly to apparatus employing a transistor-controlled saturable reactor for controlling the supply of current to a load.

An object of the invention is to provide improved apparatus for controlling the supply of rectified current to a load to minimize load voltage changes.

In a specific embodiment of the invention herein shown and described for the purpose of illustration, there is provided for controlling the supply of rectified current to the load a saturable reactor having an impedance winding and a control winding. The impedance winding is connected in series with an alternating-current supply source, a rectifier and a load so that unidirectional current flowing through the impedance winding sets up a first unidirectional magnetomotive force in the magnetic circuit of the reactor to reduce the impedance of the impedance winding. Reversible direct current is supplied to the control winding in response to load voltage changes. Current supplied through the control winding in one direction, that is, in a direction tending to cause desaturation of the core of the reactor, causes to be set up in the magnetic circuit a second magnetomotive force which opposes the first magnetomotive force to thereby increase the impedance of the impedance winding and reduce the output voltage of the rectifier and the current supplied to the load circuit. Current supplied in the opposite direction through the control winding, that is, in a direction tending to increase the saturation of the core, causes the second magnetomotive force to aid the first magnetomotive force to thereby reduce the impedance of the impedance winding and increase the output voltage of the rectifier and the current supplied to the load circuit.

Because of sudden changes in line voltage or load current, for example, it is desirable at times that the operating flux level in the saturable reactor be changed quickly from one level to another. Since the flux links the control winding, the rate of change of flux will be determined by the number of turns in the control winding and the voltage which can be applied to the control winding. Likewise, any change of the flux results in induced voltages in the control winding proportional to the number of turns in the winding and the rate of change of the flux linking the winding. For the purpose of keeping the control current requirements low, it would be advantageous to use as many turns as possible in the control winding. However, speed of response will dictate the maximum number of turns which can be used because of limitations in the voltage absorbing ability of the current control devices in the supply circuit for the winding. It has been found preferable to employ transistors for controlling both the saturating current and the desaturating current supplied to the control winding. As is well known, transistors are subject to damage by excessive voltages and, therefore, the control apparatus employing transistors must be designed to avoid such damage.

It is possible by the use of a biasing winding to place the control range of a saturable reactor-controlled rectifier entirely in the positive or negative control current region so that current can be supplied in one direction only to the control winding. Such an arrangement has the disadvantage that the source of current for energizing the biasing winding acts as a load on the biasing winding. The current in the biasing winding set up by the induced voltage in the biasing winding thus results in a magnetomotive force which opposes the change in flux level.

It has also been found to be disadvantageous to use two control windings and two transistors for controlling the energization of the control windings, respectively, to cause the windings to set up magnetomotive forces in opposite directions, respectively. In such an arrangement, each transistor may be subject to a voltage equal to twice the maximum voltage across each winding. In the arrangement employing a single control winding and two transistors for controlling the supply of current in opposite directions, respectively, to the control winding, in accordance with the present invention, each transistor is required to withstand a voltage equal to the maximum voltage across the control winding.

In the specific embodiment of the invention herein shown and described, current from a direct-current source is supplied through a first resistor to two parallel branch paths each comprising the emitter-collector path of a transistor and a resistor in series. Specifically, the transistors are of the p-n-p type having their emitters connected to a terminal of the first resistor. The collector of a first of the transistors is connected to a first terminal of a second resistor and the collector of the second transistor is connected to a first terminal of the third resistor. The terminals of the control winding are effectively connected to the first terminals of the second and third resistors, respectively. The conductance of the first and second transistors is controlled in response to load voltage changes to cause the conductance of one of the transistors to increase and the conductance of the other transistor to decrease simultaneously. In this manner the current in the control winding is caused to change in both amplitude and direction to control the flux level in the saturable reactor and thus control the output voltage of the rectifier which supplies current to the load.

Figure 2:
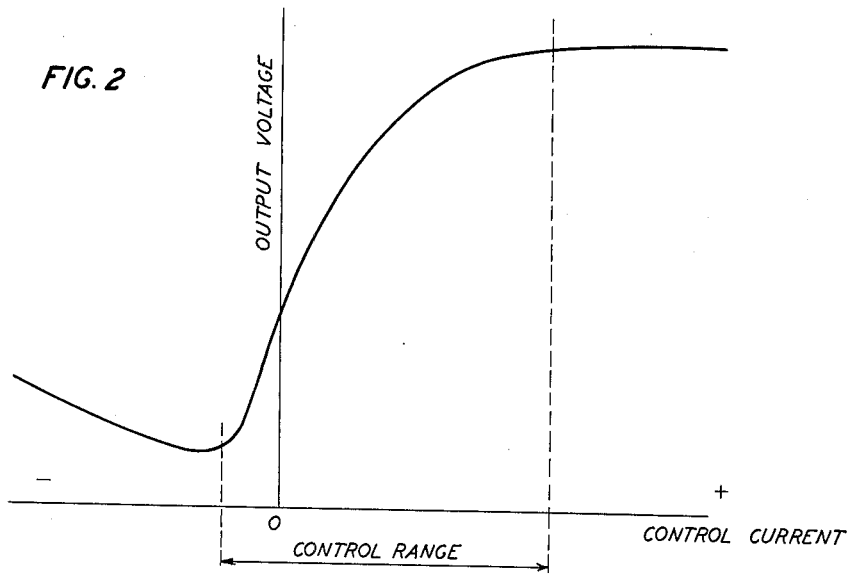
Figure 3:
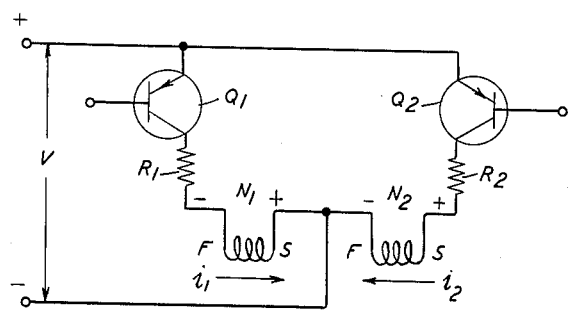

The invention will now be described in greater detail with reference to the accompanying drawing in which:

FIG. 1 is a schematic view of a current supply circuit embodying the invention; and FIGS. 2 and 3 are diagrams to which reference will be made in the description of the invention.

Referring now particularly to FIG. 1 of the drawing, there is provided apparatus comprising a transformer 10, a saturable reactor 11 and a rectifier 12 for supplying regulated rectified current from an alternating-current supply source 13 to a load circuit including a load 14 and a floating battery 15 connected across the load. The primary 16 of transformer 10 is connected to the supply source 13. The transformer 10 has two secondaries 17 and 18. A mid-terminal 19 of secondary winding 17 is directly conductively connected to the negative load terminal. One of the secondary end terminals 20 is connected through an impedance winding 22 of the saturable reactor 11 and a rectifying element 23 of the rectifier 12 to the positive load terminal. The other end terminal 21 of the secondary 17 is connected through a second impedance winding 24 and a second rectifying element 25 to the positive load terminal. The impedance windings 22 and 24 are wound on the outer legs respectively of a three-legged core 26 of magnetic material. A single control winding 27 is wound upon the center leg of the core 26.

A bridge rectifier 30 having its input connected to the transformer secondary 18 is provided for energizing a control circuit comprising a plurality of p-n-p type transistors 31, 32, 33, 34, 35 and 36 for supplying control current to the control winding 27. A filtering condenser 37 is provided across the output terminals of rectifier 30. The positive output terminal of rectifier 30 is conductively connected to the positive load terminal. When the control current flows through winding 27 in one direction, the resulting magnetomotive force set up in the reactor core aids each of the magnetomotive forces set up by the currents flowing through impedance windings 22 and 24 to increase the flux in the magnetic circuits of the core and thus reduce the impedance of each of windings 22 and 24. The result is to increase the output voltage of rectifier 12. Current in the opposite direction through control winding 27 produces a magnetomotive force to cause a reduction of the flux level in the core, an increase of the impedance of impedance windings 22 and 24 and a reduction of the output voltage of rectifier 12.

Connected across the output of rectifier 30 is a current path comprising a constant voltage, p-n junction diode 38 and a resistor 39 in series. The common terminal of diode 38 and resistor 39 is connected to the base of transistor 31. The emitter of transistor 31 is connected through a resistor 40 to the positive terminal of rectifier 30. The collectors of transistors 31 and 32 have a common terminal connected through a rectifying element 41 and a resistor 42 in series to the negative terminal of rectifier 30. The emitter of transistor 31 is connected to the base of transistor 32. The emitters of transistors 32 and 33 have a common terminal connected through a resistor 43 to the positive terminal of rectifier 30. The base of transistor 33 and the emitter of transistor 34 have a common terminal connected through a resistor 44 to the positive output terminal of rectifier 30. The collectors of transistors 33 and 34 have a common terminal connected through a rectifying element 45 and a resistor 46 in series to the negative terminal of rectifier 30. The rectifying elements 41 and 45 are provided to protect the transistors from high induced transient voltages in the control winding under certain abnormal conditions of operation. Under normal operating conditions they have practically no effect on the circuit performance.

The emitters of transistors 35 and 36 have a common terminal connected through a resistor 47 to the positive terminal of rectifier 30. The base of transistor 34 and the collector of transistor 35 have a common terminal connected through a resistor 48 to the negative terminal of rectifier 30. The collector of transistor 34 is connected through a path comprising a 300-ohm resistor 49 and a 150-microfarad condenser 50 in series to the collector of transistor 35. The collector of transistor 36 is connected to the common terminal of diode 38, resistor 39 and the base of transistor 31.

Two current path are connected across the load 14. A first of these paths comprises a constant voltage, p-n junction diode 51 and a resistor 52 in series and the second path comprises resistors 53 and 54 in series. The base of transistor 35 is connected to the common terminal of diode 51 and resistor 52 and the base of transistor 36 is connected to the common terminal of resistors 53 and 54. The terminals of the control winding 27 of saturable reactor 11 are connected to the common terminal of rectifying element 41 and resistor 42 and to the common terminal of rectifying element 45 and resistor 46, respectively. A transient voltage suppressing device 55 functions by Zener breakdown action of either polarity of applied voltage to effectively limit peak voltages which might occur due to energization or subsidence transients in the circuit to which the device is connected.

A suitable resistance value for each of resistors 40, 44 and 54 is 1,000 ohms and resistor 39 may have a resistance value of 250 ohms. Resistors 42, 43 and 46 may have resistance values of 65 ohms, 5 ohms and 20 ohms, respectively. Suitable resistance values of resistors 47, 48, 52 and 53 are 510 ohms, 4,700 ohms, 3,900 ohms and 250 ohms, respectively. Transistors 31 and 34 are preferably of the 2N301A type, transistors 32 and 33 are preferably of the 2N174 type and transistors 35 and 36 are preferably of the 2N383 type.

FIG. 2 illustrates the relationship between the current supplied to control winding 27 and the output voltage of rectifier 12 when it supplies current to a fixed resistance load. It is desired to have the control current extend over a wide range and, as shown in the graph, this range extends between the vertical dash lines from a maximum value in the positive region through zero current to a current value in the opposite direction, that is, in the negative region. In the positive or saturating region, the magnetomotive force set up by the control winding 27 aids the magnetomotive force set up by each of the impedance or gate windings 22 and 24 to increase the flux level in the core and thus increase the output voltage of rectifier 12. In the negative or desaturating region, the magnetomotive force set up by the control winding 27 opposes the magnetomotive force set up by each of the impedance or gate windings 22 and 24 to decrease the flux level in the core and thus decrease the output voltage of the rectifier 12.

By the use of a suitably energized biasing winding on the center core leg of the reactor 11, it will be possible to locate the control range entirely in either the positive or negative current region. However, since it is not possible to supply the biasing ampere-turns from a circuit of infinite impedance, such an arrangement has the disadvantage that the source of biasing current will act as a load on the biasing winding and therefore oppose any change of flux level in the reactor core by passing currents set up by voltages induced in the winding.

An alternate approach to the problem of controlling the flux level in the core of reactor 11 would be to use a dual control arrangement in opposition for obtaining positive and negative ampere-turns. Such an arrangement is depicted in the diagram of FIG. 3. There is shown a voltage sourve V from which current is supplied to control windings $N_1$ and $N_2$ which are similarly wound from a start terminal S to a finish terminal F and which may have equal turns, for example. The current for winding $N_1$ flows from the positive terminal of the source V through the emitter-collector path of transistor $Q_1$, through a resistor $R_1$ and into the F terminal and out of the S terminal of winding $N_1$ to the negative terminal of the source. The current for winding $N_2$ flows from the positive terminal of the source through the emitter-collector path of transistor $Q_2$, through resistor $R_2$, and into the S terminal and out of the F terminal of winding $N_2$ to the negative source terminal. Thus transistor $Q_1$ controls a saturating current $i_1$ while transistor $Q_2$ controls a desaturating current $i_2$, as indicated by the arrows in the sketch. In operation, to increase the saturating effect of the control windings, transistor $Q_1$ could be turned proportionately on as transistor $Q_2$ is simultaneously turned proportionately off.

If we consider the case where it is desired to change suddenly from a completely saturated flux condition to complete desaturation, this would be achieved by turning transistor $Q_2$ completely on and simultaneously turning transistor $Q_1$ completely off. The changing flux linking the windings $N_1$ and $N_2$ will induce voltages of the polarity shown. Assuming the control windings to exhibit a very high impedance during this flux changing period, most of the voltage of source V will appear across the winding $N_2$. With the turns of windings $N_1$ and $N_2$ equal, a voltage equal to the voltage across winding $N_2$ will be induced in winding $N_1$. It will be evident, therefore, that a disadvantage of the arrangement shown in FIG. 3 is that the transistor $Q_1$ will be required to absorb a voltage equal to twice the voltage of the source V while the circuit is applying a voltage equal to the source voltage to the $N_2$ winding to produce the flux change. Another disadvantage of this arrangement is that the two windings required on the control leg of the reactor core detract from the space available for the gating windings and result in increasing the reactor construction cost.

Considering now the portion of the circuit of FIG. 1 comprising transistors 32 and 33, the collectors of which are connected by means of rectifying elements 41 and 45 to the terminals of the single control winding 27, transistor 32 will control the saturating current supplied to control winding 27 and transistor 33 will control the desaturating current supplied to the control winding. Let us again consider the case where it is desired to change suddenly from a completely saturated flux condition to complete desaturation. This will be achieved by turning transistor 32 completely off while simultaneously turning transistor 33 completely on. Assuming a voltage of 57 volts from the auxiliary rectifier 30 and that the control winding 27 has a very large impedance during this flux changing period, then there will be impressed across the control winding a voltage of about 45 volts, the terminal of winding 27 connected to the collector of transistor 33 being positive with respect to its other terminal. Since transistors 32 and 33 can each safely withstand an emitter-collector voltage of 45 volts, the circuit may be designed to impress 45 volts across the control winding without causing damage to the transistors. In the arrangement of FIG. 3 using the two control windings $N_1$ and $N_2$, the voltage impressed across the transistor $Q_1$ is twice the voltage across the winding $N_2$. Therefore, if the maximum safe voltage which the transistors $Q_1$ and $Q_2$ will withstand is 45 volts, then only half this voltage, that is 22½ volts, could be impressed safely across the winding $N_2$. Since the response time of a magnetically-controlled system is inversely proportional to the instantaneous voltage applied to the control winding, any limitation of this voltage is undesirable. Comparing the circuit of FIG. 1 with the circuit arrangement of FIG. 3, it is evident that at two-to-one improvement in the speed of response of the circuit is achieved by using the circuit of FIG. 1 while at the same time economy of control winding space and material requirements are realized.

Further considering the operation of the circuit of FIG. 1, let us assume a decrease of voltage across the load. The voltage across resistor 53 thus decreases to cause a decrease of current flowing through resistor 47 into the emitter and out of the base of transistor 36, thus causing decreased current from source 30 to flow through resistor 47, into the emitter and out of the collector of transistor 36 and through resistor 39 to the negative terminal of rectifier 30. There is impressed across the emitter-base path of transistor 35 a voltage equal to the difference of the voltage across the constant voltage diode 51 and the voltage across resistor 47. The decreased voltage drop across resistor 47 will cause increased current to flow into the emitter and out of the base of transistor 35, thus causing increased current from source 30 to flow through resistor 47, the emitter-collector path of transistor 35 and resistor 48, all in series. The resulting increased voltage drop across resistor 48 causes decreased current to flow through the path comprising resistor 44, the emitter-base path of transistor 34 and resistor 48 in series, thus causing a decrease of current through resistor 44, the emitter-collector path of transistor 34, rectifying element 45 and resistor 46, all in series. Decreased current will therefore flow through a series path comprising resistor 43, the emitter-base path of transistor 33, the emitter-collector path of transistor 43, rectifying element 45 and resistor 46. As a result, decreased current will also flow in a series path comprising resistor 43, the emitter-collector path of transistor 33, rectifying element 45 and resistor 46. There is thus a decreased voltage drop across the resistor 46.

A voltage equal to the difference of the constant reference voltage across diode 38 and the voltage across resistor 43 is impressed upon the path comprising the emitter-base paths of transistors 31 and 32 in series. Due to the decreased voltage drop across resistor 43, the current through the emitter-base paths of transistors 31 and 32 in series is increased, thereby causing an increase of current flowing out of the collectors of transistors 31 and 32 and through the path comprising rectifying element 41 and resistor 42 in series. The voltage drop across the resistor 42 is therefore increased.

As a result of the increased voltage drop across the resistor 42 and the decreased voltage drop across the resistor 46, increased current will flow through the control winding 27 in a direction to increase the flux level in the core to increase its saturation, that is, current will flow into the terminal of winding 27 connected to the collector path of transistor 32 and out of the terminal connected to the collector path of transistor 33. The increased saturation of the core will cause a reduction of the impedance of impedance windings 22 and 24 to raise the output voltage of rectifier 12 and thus to increase the current supplied to the load circuit. The initially assumed decrease of load voltage is thus minimized.

It will be understood from the above description of operation that, when the load voltage has a predetermined normal value, the voltage across resistor 42 may be somewhat larger than the voltage across resistor 46 to cause the flow of current through the control winding in a first direction to set up a magnetomotive force which aids the magnetomotive forces set up by the impedance windings 22 and 24. A decrease of load voltage below the normal value will result in increasing the current in the control winding in said first direction. An increase of load voltage above normal will cause an increase of voltage drop across resistor 46 and a decrease of voltage drop across resistor 42 to cause the control winding current in said first direction to decrease toward zero current. A sufficiently large increase of load voltage will cause the voltage across resistor 46 to increase and the voltage across resistor 42 to decrease simultaneously to such an extent that the voltage across resistor 46 is larger than the voltage across resistor 42. The current then flows through the control winding in the second or opposite direction such that the magnetomotive force set up by the control winding opposes the magnetomotive forces due to windings 22 and 24, thereby further reducing the flux level in the core and further reducing the output voltage of rectifier 12. There is thus realized in the magnetically-controlled regulating system a high speed of response over a wide range of control current which results in a wide range of control of output voltages of the rectifier 12.

What is claimed is:

1. In combination, a saturable reactor having an impedance winding and a control winding to which current may be supplied to control the impedance of said impedance winding, a first and a second transistor each having a plurality of electrodes comprising an emitter, a collector and a base, a first and a second resistor, a first current path comprising in series the emitter-collector path of said first transistor and said first resistor, a second current path in parallel with said first current path comprising in series the emitter-collector path of said second transistor and said second resistor, each of said parallel current paths having a terminal intermediate its end terminals, means for connecting the terminals of said control winding to said intermediate terminals respectively, means for connecting said parallel current paths to a source of direct current, means for controlling the emitter-base current of said first transistor to thereby control its emitter-collector current, and means responsive to the emitter-collector current of said first transistor to control the emitter-base current of said second transistor and thereby control the emitter-collector current of said second transistor.

2. The combination with a magnetic device having a magnetic circuit and a control winding to which current may be supplied for controlling the flux level in said magnetic circuit, of a first and a second transistor, a first and a second resistor, means for supplying current from a direct-current source to a first path comprising said first transistor and said first resistor in series, means for supplying current from said source to a second path comprising said second transistor and said second resistor in series, means for impressing across said winding a voltage substantially equal to the difference of the voltages across said resistors respectively, and means for simultaneously increasing the conductance of one of said transistors and decreasing the conductance of the other of said transistors to control the voltages across said resistors respectively.

3. The combination with a magnetic device having a magnetic circuit and a control winding to which current may be supplied for controlling the flux level in said magnetic circuit, of a first and a second transistor, a first, a second and a third resistor, means for supplying current to a first current path comprising said first resistor, said first transistor and said third resistor all in series, means for supplying current to a second current path comprising said second resistor, said second transistor and said third resistor all in series, means for controlling the conductance of said first transistor to control the voltages across said first and third resistors respectively, means responsive to the voltage across said third resistor for changing the conductance of said second transistor inversely with respect to the change of conductance of said first transistor, and means for impressing across said control winding a voltage substantially equal to the difference of the voltages across said first and second resistors respectively.

4. The combination with a magnetic device having a magnetic circuit and a control winding to which current may be supplied for controlling the flux level in said magnetic circuit, of a first and a second transistor having an emitter, a collector and a base, a first, a second and a third resistor, a direct-current supply source having a first and a second terminal, means comprising said third resistor for connecting the emitters of said transistors to said first terminal of said supply source, means comprising said first resistor for connecting the collector of said first transistor to said second terminal of said supply source, means comprising said second resistor for connecting the collector of said second transistor to said second terminal of said supply source, means for controlling the base current of said first transistor to control its conductance, means responsive to the voltage across said third resistor for changing the conductance of said second transistor inversely with respect to change of conductance of said first transistor, and means for connecting the terminals of said control winding to said collectors respectively.

5. In combination, a saturable reactor having an impedance winding and a control winding on a core of magnetic material, means for supplying unidirectional current through said impedance winding to a load to produce a magnetic flux linking said windings, a first and a second transistor, means for deriving a voltage which varies with changes in the load voltage, means responsive to said derived voltage for changing the conductances of said transistors in opposite directions simultaneously, and means responsive to the relative conductances of said transistors for controlling both the magnitude and the polarity of the voltage across said control winding to thereby correspondingly adjust the flux level in said core and the current level to said load.

6. The combination with a magnetic device for controlling supply of current to a load, said device having a magnetic circuit and a control winding, means for supplying current to said control winding, a first and a second transistor, means for deriving a voltage which varies in response to changes of the voltage of said load, means responsive to changes in said derived voltage for changing the conductances of said transistors in opposite directions simultaneously, and means responsive to the relative conductances of said transistors for controlling both the magnitude and the direction of the current supplied to said control winding to thereby control the flux level in said magnetic circuit and the current supply to said load.

7. In combination, a saturable reactor controlling the supply of current to a load including a magnetic circuit, an impedance winding and a control winding, means for supplying unidirectional current to said impedance winding to set up a unidirectional flux in said magnetic circuit, means for supplying current from a direct-current source to said control winding including a first and a second transistor, means responsive to changes in the voltage of said load for changing the conductances of said transistors in opposite directions simultaneously, and means responsive to the relative conductances of said transistors for controlling both the magnitude and the direction of the current supplied to said control winding to thereby control the level of said unidirectional flux in said magnetic circuit and the current supply to said load.

8. In combination, a saturable reactor having a magnetic circuit, an impedance winding and a control winding, means for supplying unidirectional current through said impedance winding to a load to produce a voltage across said load and to set up a unidirectional flux in said magnetic circuit, means for deriving from said load circuit a first voltage which varies in response to load voltage changes but at a faster rate, a first and a second transistor, means responsive to said first voltage for controlling the conductance of said first transistor inversely with respect to said load voltage changes, means responsive to changes of conductance of said first transistor to cause the conductance of said second transistor to change inversely with respect to the conductance changes of said first transistor, and means responsive to the relative conductances of said transistors for controlling both the magnitude and the direction of the current supplied to said control winding, thereby controlling the level of said unidirectional flux in said magnetic circuit to control said load voltage.

9. A combination in accordance with claim 8 in which each of said transistors has an emitter, a collector and a base, and in which there are provided a first, a second and a third resistor, a direct-current supply source having a first and a second terminal, means comprising said third resistor for connecting the emitters of said transistors to said first terminal of said supply source, means comprising said first resistor for connecting the collector of said first transistor to said second terminal of said supply source, means comprising said second resistor for connecting the collector of said second transistor to said second terminal of said supply source, means responsive to the voltage across said third resistor for changing the conductance of said second transistor, and means for connecting the terminals of said control winding to said collectors respectively.

References Cited by the Examiner
UNITED STATES PATENTS

| | | | |
|---|---|---|---|
| 2,752,551 | 2/55 | Bixby | 323—89 |
| 2,775,712 | 12/56 | MacCallum et al. | 307—93 |
| 2,873,422 | 2/59 | Miller et al. | 323—89 |
| 2,989,686 | 6/61 | Pinckaers et al. | 323—89 |
| 3,087,107 | 4/63 | Hunter et al. | 323—89 |
| 3,114,873 | 12/63 | Love | 307—88.5 |

LLOYD McCOLLUM, *Primary Examiner.*